United States Patent
Boger et al.

(10) Patent No.: US 12,123,635 B2
(45) Date of Patent: Oct. 22, 2024

(54) INTERMEDIATE STORE FOR REFRIGERANT AND REFRIGERANT SYSTEM

(71) Applicant: Mahle International GmbH, Stuttgart (DE)

(72) Inventors: Markus Boger, Stuttgart (DE); Sascha Lindauer, Schorndorf (DE); Dominik Behnert, Leonberg (DE); Gustavo Fuga Santos, Gerlingen (DE)

(73) Assignee: Mahle International GmbH (DE)

( * ) Notice: Subject to any disclaimer, the term of this patent is extended or adjusted under 35 U.S.C. 154(b) by 404 days.

(21) Appl. No.: 17/308,039

(22) Filed: May 4, 2021

(65) Prior Publication Data

US 2021/0364204 A1      Nov. 25, 2021

(51) Int. Cl.
| | |
|---|---|
| F25B 45/00 | (2006.01) |
| B60H 1/00 | (2006.01) |
| F25B 13/00 | (2006.01) |
| F25B 41/24 | (2021.01) |
| F25B 49/02 | (2006.01) |

(52) U.S. Cl.
CPC ......... *F25B 45/00* (2013.01); *B60H 1/00907* (2013.01); *F25B 13/00* (2013.01); *F25B 41/24* (2021.01); *F25B 49/027* (2013.01); *B60H 2001/00942* (2013.01); *F25B 2345/001* (2013.01); *F25B 2345/006* (2013.01); *F25B 2400/23* (2013.01)

(58) Field of Classification Search
CPC .... F25B 45/00; F25B 2400/23; F25B 43/006; F25B 2500/23; F25B 2345/001; F25B 41/24
See application file for complete search history.

(56) References Cited

U.S. PATENT DOCUMENTS

| | | | | |
|---|---|---|---|---|
| 4,508,135 A | * | 4/1985 | Schlesch | F16L 39/04 |
| | | | | 137/185 |
| 10,001,305 B2 | * | 6/2018 | Cowley | F24D 19/00 |
| 10,926,608 B2 | * | 2/2021 | Hosokawa | B60H 1/32 |
| 2018/0093549 A1 | * | 4/2018 | Resutek | F25B 43/003 |
| 2018/0094843 A1 | * | 4/2018 | Connell | F25B 31/006 |

FOREIGN PATENT DOCUMENTS

| | | |
|---|---|---|
| DE | 102011107404 A1 | 1/2012 |
| DE | 102011118162 A1 | 5/2013 |

OTHER PUBLICATIONS

English abstract for DE-102011118162.
English abstract for DE-102011107404.

* cited by examiner

*Primary Examiner* — Ana M Vazquez
(74) *Attorney, Agent, or Firm* — Fishman Stewart PLLC

(57) ABSTRACT

An intermediate refrigerant store of a refrigerant system may include a storage container delimiting a refrigerant storage space, a first feed, and a second feed separate from the first feed. The first feed and the second feed may be fluidically connected with the refrigerant storage space for feeding of a refrigerant. At least one discharge may be fluidically connected to the refrigerant storage space and may be configured to discharge the refrigerant from the refrigerant storage space. At least one valve arrangement may be disposed in an associated feed of the first feed and the second feed via which the associated feed may be fluidically closable and openable.

35 Claims, 6 Drawing Sheets

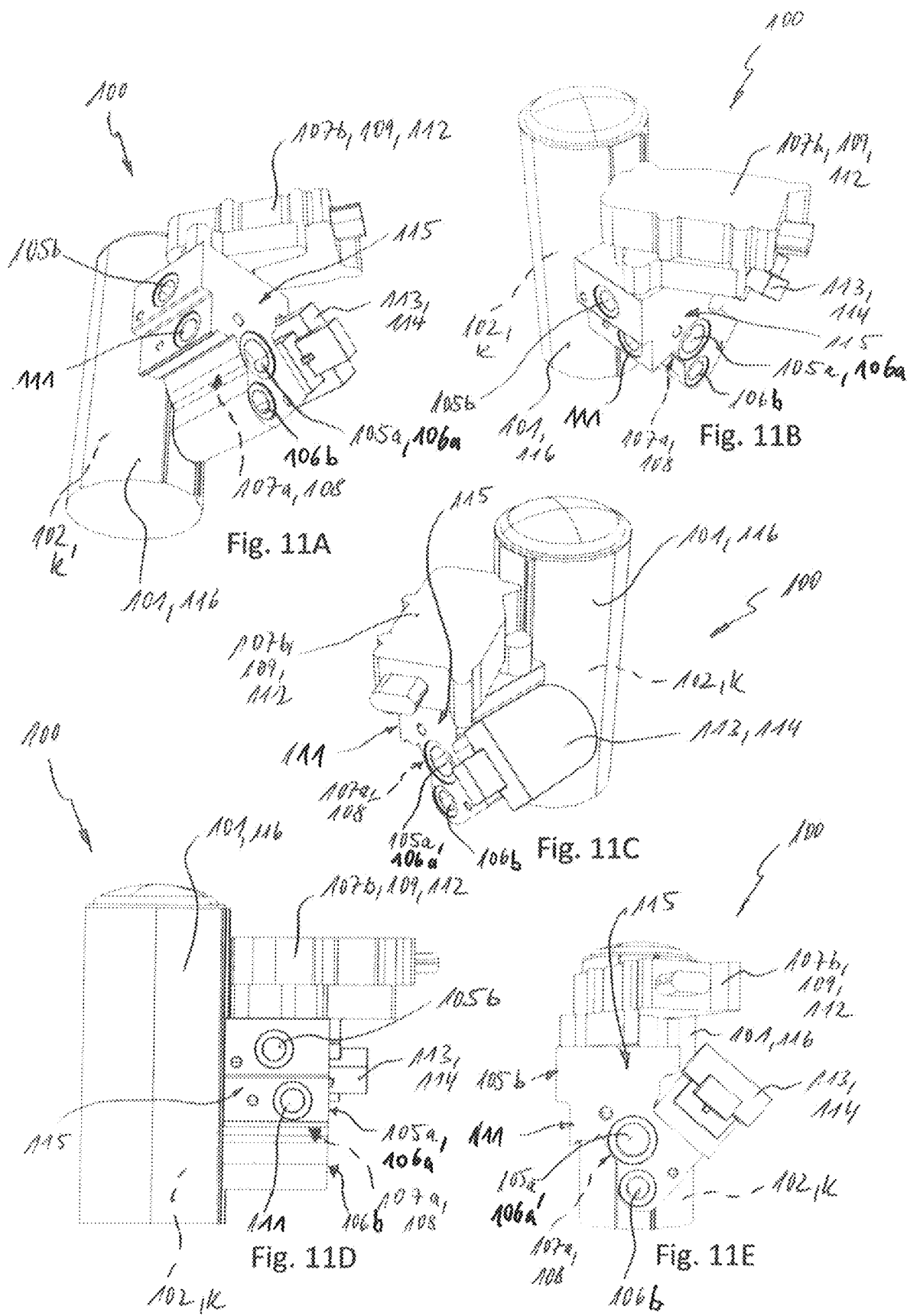

INTERMEDIATE STORE FOR REFRIGERANT AND REFRIGERANT SYSTEM

CROSS-REFERENCE TO RELATED APPLICATIONS

This application claims priority to German Patent Application No. DE 10 2020 205 668.4, filed on May 5, 2020, the content of which is hereby incorporated by reference in its entirety.

TECHNICAL FIELD

The invention relates to an intermediate store for refrigerant and a refrigerant system with such an intermediate store for refrigerant. The invention further relates to a motor vehicle with such a refrigerant system and a method for operating the refrigerant system.

BACKGROUND

For some time, motor vehicles are equipped with refrigerant systems which have a refrigerant circuit in which a refrigerant circulates.

In general, heat exchangers which are able to be flowed through by the refrigerant are arranged in the refrigerant circuit. Usually, such a refrigerant circuit comprises at least two such heat exchangers, of which in a first operating state of the refrigerant circuit a first functions as a condenser and a second functions as an evaporator. Here, in addition, a compressor for compressing the refrigerant, and an expansion valve for expanding the refrigerant, are present in the refrigerant circuit, wherein the compressor, with respect to a volume flow of refrigerant flowing through the refrigerant circuit, is arranged upstream of the condenser and downstream of the evaporator, and the expansion valve is arranged upstream of the evaporator and downstream of the condenser. A high pressure region of the refrigerant circuit, comprising the condenser, completes here a low pressure region of the refrigerant circuit, comprising the evaporator, to form the refrigerant circuit, wherein the high pressure region and the low pressure region are separated from one another by means of the expansion valve on the one hand and by means of the compressor on the other hand.

By means of a reversal of the throughflow direction of the refrigerant flowing through the refrigerant circuit, such conventional refrigerant systems can be transferred into a second operating state, in which the first heat exchanger then functions as an evaporator and the second heat exchanger functions as a condenser. This makes it possible to use the refrigerant system, depending on the selected operating state, as a heat pump or as a refrigeration machine, so that by means of the refrigerant circuit, according to the operating state, heat can be fed to or respectively extracted from a passenger compartment which is thermally coupled with one of the two heat exchangers. In order to equalize differences in the required quantity of refrigerant occurring during the operation of the system, conventional refrigerant systems, which can be switched over between the operation as refrigeration machine and as heat pump, additionally comprise an intermediate store for refrigerant for the storage of refrigerant. This intermediate store for refrigerant is usually arranged here in the low pressure region of the refrigerant circuit, but can also be present in the high pressure region.

It proves to be disadvantageous in such refrigerant circuits that the low pressure intermediate store for refrigerant must be realized having a comparatively large volume, in order to be able to temporarily store a sufficient quantity of expanded refrigerant. Accordingly, such low pressure intermediate stores for refrigerant are comparatively large and heavy in construction, which is accompanied by a high material requirement and thus also material costs. Furthermore, such refrigerant circuits with low pressure intermediate stores for refrigerant require a relatively large quantity of refrigerant. Moreover, the low pressure intermediate store for refrigerant which is present in the low pressure region influences in a negative manner an efficiency of the refrigeration machine or respectively heat pump which is realized by means of the refrigerant circuit, which has a directly reducing effect on a range of a motor vehicle that is equipped with such a refrigerant circuit, especially when an electric motor vehicle is concerned.

Two high pressure intermediate stores for refrigerant can also be used, which are mounted on a condenser in the cooling module or respectively on an indirect condenser for the interior heating. Depending on the mode of operation of the circuit, one of the intermediate stores for refrigerant is used while the other must be emptied, which requires additional valves and increases the costs.

SUMMARY

It is therefore an object of the present invention—in particular for the elimination of the disadvantages indicated above—to indicate new ways for refrigerant circuits and for intermediate stores for refrigerant for such a refrigerant circuit and for methods for the operating of such a refrigerant circuit.

This problem is solved by the subject matter of the independent claim(s). Preferred embodiments are the subject matter of the dependent claim(s).

The basic idea of the invention is accordingly to implement an intermediate store for refrigerant for a refrigerant system able to be operated in particular switchably as a refrigeration machine and as a heat pump, or respectively a refrigerant system with such an intermediate store for refrigerant, so that the intermediate store for refrigerant can be arranged or respectively is arranged in the high pressure region of the refrigerant system or respectively refrigerant circuit. For this, the intermediate store for refrigerant is equipped with two separate refrigerant feeds and at least one refrigerant discharge, wherein in at least one of the feeds a valve arrangement is present, by means of which the respective feed can be closed in a fluid-tight manner or respectively freed.

Advantageously, such an intermediate store for refrigerant, arranged in the high pressure region of a refrigerant system, is particularly compact in construction, because the refrigerant, which is to be stored temporarily, in its compressed form present in the high pressure region, requires a smaller storage volume. Moreover, by means of the high pressure intermediate store the efficiency of a refrigeration machine or respectively heat pump which is realized by means of the refrigerant system can be increased, which has a direct effect on an overall efficiency of a motor vehicle which is equipped with such a refrigerant system. Particularly if this motor vehicle is an electric motor vehicle, a particularly great range thereof can be achieved.

An intermediate store for refrigerant according to the invention, which serves for the intermediate storing of a refrigerant of a refrigerant system—in particular of a refrigerant system of a motor vehicle—comprises a storage container which delimits on the inner side a refrigerant storage space. Moreover, the intermediate store for refrigerant comprises a first feed and a second feed, separate from the latter, which are fluidically connected with the refrigerant storage space for the feeding of refrigerant. The intermediate store for refrigerant has, furthermore, at least one discharge which, for the discharging of refrigerant from the refrigerant storage space, is fluidically connected with same. Here in at least one of the feeds a (first or respectively second) valve arrangement is present, by means of which this feed is fluidically closable or able to be freed for flowing through with refrigerant. Advantageously, such an intermediate store for refrigerant is able to be used in a high pressure region of a refrigerant system, wherein the valve arrangement of the intermediate store for refrigerant permits a switching over of the refrigerant system between at least two operating states. Thereby, by means of the intermediate store for refrigerant, a particularly efficient refrigerant system can be realized, which is able to fulfil a particularly large spectrum of temperature control tasks with various predetermined configurations. Such temperature control tasks can be a feeding of heat to a vehicle interior in a heat pump operation of the refrigerant system or a discharging of heat from the vehicle interior in a refrigeration machine operation of the refrigerant system. Here, by means of the intermediate store for refrigerant, a quantity of refrigerant present in the refrigerant system can be reduced compared to conventional refrigerant systems with a low pressure intermediate store for refrigerant. In addition, the intermediate store for refrigerant according to the invention is particularly light and compact in construction, which enables a saving of material costs.

It shall be understood that the refrigerant system is operated, both in heat pump operation and also in refrigeration machine operation, as a heat pump in the thermodynamic sense, wherein on switching over between heat pump operation and refrigeration machine operation one of the heat sinks and one of the heat sources change over. One of the heat sources of the heat pump operation, on switching over into the refrigeration machine operation, mutates to the heat sink of the refrigeration machine operation.

According to a preferred further development of the intermediate store for refrigerant, a first valve arrangement is present in the first feeds and a second valve arrangement is present in the second feeds, by means of which the respective feed is fluidically closable or able to be freed for flowing through with refrigerant. This simplifies the switching indicated above between the operating states of a refrigerant system which is equipped with the intermediate store for refrigerant according to the invention.

In a further preferred further development of the intermediate store for refrigerant, the (first) valve arrangement comprises a non-return valve or is such a non-return valve, the forward direction of which runs directed towards the refrigerant storage space. Such a non-return valve advantageously operates automatically, so that the respective feed is fluidically closed or freed for flowing through with refrigerant solely dependent on a direction of the pressure drop applied on the non-return valve, without external control interventions being required for opening or respectively closing the (first) valve arrangement. A corresponding control/regulation arrangement can thus be dispensed with, with which cost advantages are associated.

Another advantageous further development of the intermediate store for refrigerant makes provision that the (second) valve arrangement comprises or is an—in particular controllable—directional valve. Advantageously, a switching between the operating states of a refrigerant system comprising the intermediate store for refrigerant can thus be achieved, which is able to be implemented in a particularly simple manner.

According to a further preferred further development of the intermediate store for refrigerant, the directional valve is configured as a 2/1-way valve. Such a 2/1-way valve is distinguished by particularly low production- or acquisition costs.

In a further preferred further development of the intermediate store for refrigerant, the second feed comprises a branch. The (second) valve arrangement has two 2/1-way valves or alternatively is configured as a 3/2-way valve. The two 2/1-way valves of the (second) valve arrangement or respectively the 3/2-way valve forming the valve arrangement are or respectively is arranged in the second feed so that by means of the (second) valve arrangement the second feed and—alternatively or additionally—the branch is fluidically closable or able to be freed for flowing through with refrigerant. This improves the switching between the operating states of a refrigerant system comprising the intermediate store for refrigerant.

A further advantageous further development of the intermediate store for refrigerant makes provision that the intermediate store for refrigerant comprises a first and a second discharge. Advantageously, an efficiency of a refrigerant system equipped with the intermediate store for refrigerant can thus be additionally increased in at least one of its operating states.

According to a further preferred further development of the intermediate store for refrigerant, a throttle arrangement is present in at least one discharge. Preferably, such a throttle arrangement is arranged exclusively in the first discharge. Expediently, the throttle arrangement comprises an expansion valve or is an expansion valve. This permits a (first) heat exchanger, fluidically connected to the intermediate store for refrigerant, of a refrigerant system, comprising the intermediate store for refrigerant, being able to operate in different operating states thereof as an evaporator by means of a suitable actuation of the valve arrangement(s).

According to an advantageous further development, at least the storage container and the at least one valve arrangement are configured to be forming a structurally integral unit with one another. This reduces an installation effort, because a laborious relative positioning of the storage container and of the at least one valve arrangement with respect to one another can be dispensed with. Moreover, by means of the direct connection of the at least one valve arrangement to the storage container, any connection lines can be saved or at least kept short, which is accompanied by a saving of costs.

In a further advantageous further development of the intermediate store for refrigerant, the storage container and the throttle arrangement, which is arranged in the first discharge, are configured to be forming a structurally integral unit with one another. This reduces the installation effort, because a laborious relative positioning of the storage container and the throttle arrangement with respect to one another can be dispensed with. Moreover, by means of the direct connection of the throttle arrangement to the storage container, any connection lines can be saved or at least kept short, which is accompanied by a saving of costs.

According to a further advantageous further development of the intermediate store for refrigerant, the storage container is configured as a receiver drier, wherein in the refrigerant storage space of the receiver drier a drying agent, able to be flowed through by the refrigerant, is received for the drying of refrigerant which is guided through the refrigerant storage space. Thus advantageously by means of the drying agent, humidity can be at least partially removed from the refrigerant, said humidity being able to have a corrosive effect on components guiding the refrigerant and as a result of which a water ice formation can occur in the refrigerant.

According to a further advantageous further development of the intermediate store for refrigerant, the first and the second feed and the first and the second discharge are arranged in a shared valve block. Here, at least one selected one of the first and of the second valve arrangement and of the throttle arrangement can be fastened on the valve block. At least one selected one of the first and of the second valve arrangement and of the throttle arrangement can be screwed into the valve block. If applicable, at least one selected one of the first and of the second valve arrangement and of the throttle arrangement can be integrated in the valve block. Such an intermediate store for refrigerant is able to be produced in a particularly simple manner, because a laborious relative positioning of the feeds and discharges, grouped together in the valve block, relative to one another is dispensed with or respectively is established by the structural configuration of the valve block in a rigid manner. It shall be understood that instead of a single valve block, two or more partial valve blocks can also be used.

Expediently, the valve block is flanged onto the receiver drier, in particular laterally. Such an intermediate store for refrigerant is particularly compact in construction. Particularly preferably, the valve block and the receiver drier are soldered or screwed to one another, wherein a seal can be provided in a joint between the valve block and the receiver drier.

The invention also relates to the use of the intermediate store for refrigerant presented above in a refrigerant system with a refrigerant circuit in which at least two heat exchangers are arranged, wherein the refrigerant system has at least one first and one second operating state, and wherein in the first operating state heat is emitted from the refrigerant in the first heat exchanger and in the second operating state heat is emitted from the refrigerant in the second heat exchanger. The advantages, indicated above, of the intermediate store for refrigerant according to the invention in its use in a refrigerant system also have an impact on this refrigerant system.

Preferably the refrigerant system, in which the intermediate store for refrigerant is used in accordance with the use according to the invention, has a third operating state in addition to the first and second operating state. In this third operating state, the first heat exchanger is not flowed through by the refrigerant, so that the first heat exchange is passive in the third operating state. With the use of the intermediate store for refrigerant according to the invention in such a refrigerant system, the advantages, described above, of the intermediate store for refrigerant can be even better utilized.

The invention further relates to a refrigerant system for an air conditioning system of a motor vehicle. The refrigerant system comprises a refrigerant circuit which is divided into a high pressure region and into a low pressure region. In operation of the refrigerant system, a refrigerant circulates in the refrigerant circuit. An intermediate store for refrigerant according to the invention, presented above, is arranged in the high pressure region. The advantages of the intermediate store for refrigerant, explained above, are therefore also transferred to the refrigerant system according to the invention. The refrigerant system comprises at least a first, second and third heat exchanger, wherein the intermediate store for refrigerant is able to be connected or is connected fluidically with the first heat exchanger by means of the first feed of the intermediate store for refrigerant, and is able to be connected or is connected fluidically with the second heat exchanger by means of the second feed of the intermediate store for refrigerant. Furthermore, the intermediate store for refrigerant is connected fluidically by means of its second feed with the third heat exchanger. The refrigerant system can comprise in addition a fourth heat exchanger, configured as a chiller and able to be flowed through by the refrigerant, by means of which fourth heat exchanger heat can be fed to the refrigerant.

According to a preferred embodiment, no intermediate store for refrigerant is arranged in the low pressure region of the refrigerant system. The dispensing with such a low pressure intermediate store for refrigerant brings about advantages with regard to cost and installation space.

Particularly expediently, the first heat exchanger is configured and arranged in the refrigerant circuit so that it is optionally—in a first operating state of the refrigerant system—arranged in the high pressure region and is operable there as a condenser or—in a second operating state of the refrigerant system—is arranged in the low pressure region and is operable there as an evaporator. This advantageously permits an operation of the refrigerant system in a heat pump operation and in a refrigeration machine operation. The first operating state then corresponds to the refrigeration machine operation, in which the first heat exchanger forms a heat sink or respectively is thermally coupled to one such. By comparison, the second operating state then corresponds to the heat pump operation, in which the first heat exchanger forms a heat source or respectively is thermally coupled to one such. In the first operating state the first heat exchanger can preferably be operated as an indirect condenser.

According to a preferred embodiment, the intermediate store for refrigerant and the refrigerant circuit with the first heat exchanger are configured and coordinated with one another so that by means of the at least one valve arrangement of the intermediate store for refrigerant an adjustment can be made as to whether the first heat exchanger is arranged in the high pressure region or in the low pressure region. This permits a switching of the refrigerant system between its operating states which is able to be realised in a particularly simple manner.

Particularly expediently, the second heat exchanger is configured as a condenser arranged in the high pressure region. Thereby, efficiency of the refrigerant system can be increased.

Expediently in the low pressure region a third heat exchanger, configured as an evaporator, is arranged for the transferring of heat to the refrigerant. This also has an advantageous effect on the efficiency of the refrigerant circuit.

In an advantageous further development of the refrigerant system, a chiller, able to be flowed through by the refrigerant, is arranged in the refrigerant fluidically parallel to the evaporator. By means of this chiller, heat can be fed to the refrigerant on flowing through the chiller. Thereby, the refrigerant system can be operated in a particularly flexible manner.

Expediently, the chiller is arranged in the coolant circuit and is able to be flowed through fluidically separately from the refrigerant with coolant so that, by means of the chiller, heat can be transferred from the coolant to the refrigerant. Advantageously, the chiller therefore realizes a thermal coupling of the refrigerant circuit and of the coolant circuit.

According to a preferred embodiment, the refrigerant circuit is adjustable by means of the at least one valve arrangement of the intermediate store for refrigerant between a first and a second operating state. In the first operating state, the first heat exchanger communicates by means of the first feed of the intermediate store for refrigerant fluidically with the refrigerant storage space. In the second operating state, this fluidic communication of the first heat exchanger by means of the first feed with the refrigerant storage space is interrupted. In the second operating state, the second heat exchanger communicates by means of the second feed of intermediate store for refrigerant fluidically with the refrigerant storage space. A particularly simple switching over between the operating states of the refrigerant system is thus made possible.

According to an advantageous further development, the first heat exchanger has a first and a second connection, respectively for the directing of the refrigerant into or respectively out from the first heat exchanger. In this further development, in the first operating state the first connection is fluidically connected with the branch of the second feed, and the second connection is fluidically connected with the first feed. In the second operating state, the first connection is fluidically connected with the compressor, and the second connection is fluidically connected with the first discharge of the intermediate store for refrigerant. Advantageously, by means of a corresponding adjusting of the at least one valve arrangement of the intermediate store for refrigerant, a throughflow direction, along which the first heat exchanger is flowed through by refrigerant, can thus be reversed between the operating states of the refrigerant system. It is thereby made possible that, depending on the operating state of the refrigerant system, the first heat exchanger can be arranged in a switchable manner either in its high pressure region or low pressure region.

In a preferred further development of the refrigerant system, the refrigerant system has, in addition to the first and second, a third operating state. In this third operating state, the refrigerant system is adjustable, in particular both from the first and also from the second operating state. Here, the first heat exchanger in the third operating state is not flowed through by the refrigerant, so that the first heat exchanger is passive in the third operating state. This advantageously permits a particularly efficient operation of the refrigerant system.

According to a further advantageous further development of the refrigerant system, the second heat transmission in the third operating state communicates by means of the second feed of the intermediate store for refrigerant fluidically with the refrigerant storage space. Thereby, an even more efficient operation of the refrigerant system can be achieved.

The invention further relates to a motor vehicle with a vehicle interior and with a refrigerant system according to the invention, presented above, so that the advantages of the refrigerant system are also transferred to the motor vehicle according to the invention. In the motor vehicle according to the invention, the first heat exchanger is set up for the optional delivery or receiving of heat to or respectively from an outer environment of the motor vehicle. The second heat exchanger is set up for the emission of heat into the vehicle interior. The third heat exchanger is set up for the receiving of heat from the vehicle interior. The refrigerant system can comprise, furthermore, a fourth heat exchanger, by means of which waste heat generated from a drive unit, in particular an electric motor, for the propulsion of the motor vehicle and/or from an electrical energy store, which can be an electric traction battery of the motor vehicle, can be fed to the coolant or to the refrigerant.

The invention further relates to a method for operating a refrigerant system according to the invention, presented above, in particular in a motor vehicle according to the invention, so that the advantages of the refrigerant system according to the invention or respectively of the motor vehicle according to the invention can also be transferred to the method according to the invention. According to the method, in a first operating state of the refrigerant system the refrigerant is guided from the first heat exchanger, where it emits heat, to the intermediate store for refrigerant, so that the first heat exchanger acts as a condenser arranged in the high pressure region of the refrigerant circuit. According to the method, in a second operating state of the refrigerant circuit, the refrigerant, with simultaneous emission of heat in the second heat exchanger, is guided from this second heat exchanger to the intermediate store for refrigerant, so that the second heat exchanger acts as condenser.

According to a preferred embodiment of the method, in the first operating state of the refrigerant system the first heat exchanger is arranged in the high pressure region and is operated there as a condenser. Furthermore in this embodiment, in the second operating state of the refrigerant system the first heat exchanger is arranged in the low pressure region and is operated there as an evaporator. Advantageously, the first heat exchanger can thus function as a heat sink in the first operating state, and vice versa can function in the second operating state as a heat source, so that by means of the first heat exchanger, depending on the present operating state, either heat can be emitted from the refrigerant, or can be fed to the refrigerant.

In an advantageous further development of the method, the intermediate store for refrigerant and the refrigerant circuit with the first heat exchanger are configured and coordinated with one another so that by means of the at least one valve arrangement of the intermediate store for refrigerant, an adjustment can be made as to whether the first heat exchanger is arranged in the high pressure region or in the low pressure region. This permits a particularly simple switching of the refrigerant system between its operating states.

A further advantageous further development of the method makes provision that through corresponding adjusting of the at least one valve arrangement of the intermediate store for refrigerant in the first operating state the first heat exchanger communicates fluidically with the refrigerant storage space by means of the first feed of the intermediate store for refrigerant. Moreover, by corresponding adjusting of the at least one valve arrangement of the intermediate store for refrigerant in the second operating state the fluidic communication of the first heat exchanger by means of the first feed with the refrigerant storage space is interrupted. Furthermore—as a result of corresponding adjusting of the at least one valve arrangement of the intermediate store for refrigerant—in the second operating state the first heat exchanger can fluidically communicate with the refrigerant storage space by means of the at least one discharge of the intermediate store for refrigerant. Advantageously, a throughflow direction in which the first heat exchanger is flowed through by refrigerant is thereby reversed between the operating states of the refrigerant system, so that the first heat exchanger can operate in a particularly simple manner either as condenser or as evaporator depending on the present operating state.

In a further preferred further development of the method, in the first operating state of the refrigerant system no refrigerant is guided from the second heat exchanger directly to the intermediate store for refrigerant. By comparison, in the second operating state no refrigerant is guided from the first heat exchanger directly to the intermediate store for refrigerant. This improves the efficiency of the first heat exchanger in both operating states of the refrigerant system.

According to a further advantageous further development of the method, in a third operating state of the refrigerant system the first heat exchanger is not flowed through by refrigerant, so that the first heat exchanger is passive in the third operating state. This has a beneficial effect on the efficiency of the refrigerant system.

Expediently, in the third operating state the second heat exchanger communicates fluidically with the refrigerant storage space by means of the second feed of the intermediate store for refrigerant. This also promotes the efficiency of the refrigerant system.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing form the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically

FIGS. 11A to 11E show perspective illustrations of the intermediate store for refrigerant of FIG. 7, each in a different perspective.

DETAILED DESCRIPTION

Figure 1:
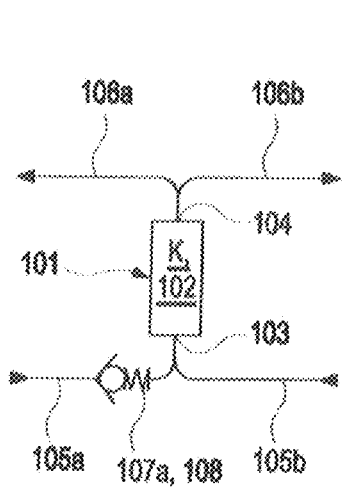
FIGS. 1 to 7 show various examples of an intermediate store for refrigerant according to the invention.

In FIGS. 1 to 7 various examples of intermediate stores for refrigerant 100 according to the invention are illustrated in structural diagrams. Such an intermediate store for refrigerant 100 serves for the intermediate storing of a refrigerant K of a refrigerant system 1. This refrigerant system 1 can be comprised by a motor vehicle. It can be seen that the intermediate store for refrigerant 100 comprises a storage container 101. The storage container 101 delimits a refrigerant storage space 102. Refrigerant K is able to be received in the refrigerant storage space 102, in particular for intermediate storage. The intermediate store for refrigerant 100 has, furthermore, a first and a second feed 105a, 105b, which are configured separately from one another. The first and the second feed 105a, 105, for the feeding of refrigerant K to the refrigerant storage space 102 are fluidically connected therewith. The fluidic connection of the first and the second feed can be realized by means of an inlet 103 which is present in a shared manner the storage container 101. Alternatively, a separate inlet 103 can be present for each of the feeds 105a, 105b, which is not shown in the FIGS. 1 to 7 for the sake of clarity.

In addition, it can be seen from FIGS. 1 to 7 that the intermediate store for refrigerant 100 comprises at least one discharge 106a, 106b which, for the discharging of refrigerant K from refrigerant storage space 102 is fluidically connected therewith. In the examples which are shown with a first and a second discharge 106a, 106b two such discharges 106a, 106b are present. For the connection of the at least one discharge 106a, 106b, the storage container 101 can have an outlet 104. Alternatively, a separate outlet 104 can be present for each of the discharges 106a, 106b, which, however, is not shown in FIGS. 1 to 7 for reasons of clarity.

FIGS. 1 to 7 illustrate furthermore that in at least one of the feeds 105a, 105b a first or respectively a second valve arrangement 107a, 107b is arranged. This first or respectively second valve arrangement 107a, 107b is set up to fluidically close, or free for the flowing through with refrigerant K, the respective feed 105a, 105b.

Figure 7:
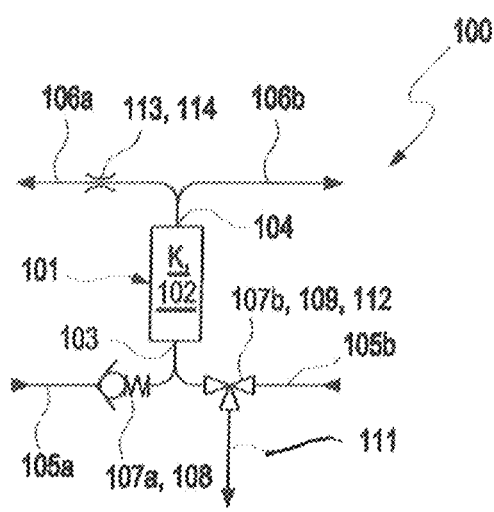

Here in the examples of FIGS. 1 and 7, a first valve arrangement 107a is present in the first feed 105a. In the examples of FIGS. 2, 3, 4 and 5, a second valve arrangement 107b is arranged in the second feed 105b. Accordingly, the example of FIG. 7 therefore comprises a first valve arrangement 107a present in the first feed 105a and a second valve arrangement 107b present in the second feed 105b. In the remaining figures, by comparison, respectively exclusively the first or the second valve arrangement 107a, 107b is present. The storage container 101 of the intermediate store for refrigerant 100 and the at least one valve arrangement 107a, 107b are configured for example to be forming a structurally integral unit with one another. This means that the valve arrangements 107a, 107b or respectively their valve blocks—not shown in the figures—form a structural unit with the storage container 101. In such a structural unit the valve arrangements 107a, 107b or respectively their valve blocks and the storage container 101 can be fastened detachably or non-detachably to one another or configured to be materially integral.

According to FIGS. 1 and 7, the first valve arrangement 107 comprises a non-return valve 108 or respectively is configured as such a non-return valve 108. The non-return valve 108 is able to be flowed through by refrigerant K along a forward direction, whereas a through-flowing of the non-return valve 108 contrary to this forward direction is automatically prevented by means of the non-return valve 108. According to the examples which are shown, the forward direction runs directed towards the refrigerant storage space 102. This means that a flow of refrigerant K is made possible through the first feed 105a via the first valve device 107a into the refrigerant storage space 102 and a backflow in the opposite direction is prevented.

Figure 2:
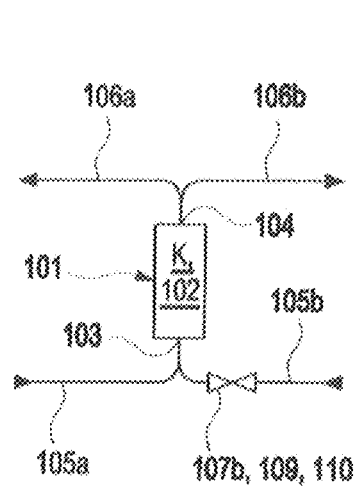
Figure 3:
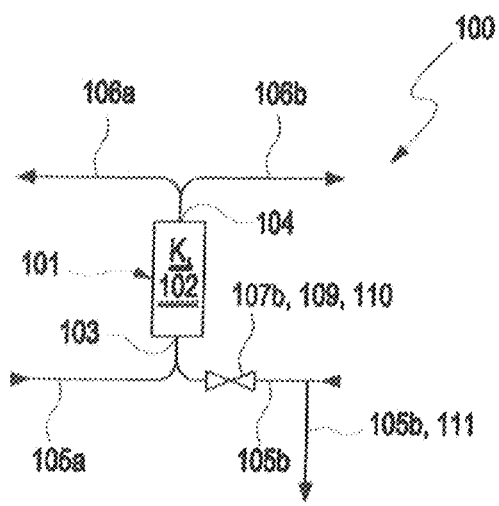

FIGS. 2, 3, 4, 5 and 7 show, furthermore, that the second valve arrangement 107b comprises a directional valve 109 or respectively is such a directional valve 109. This directional valve 109 can be configured in a controllable manner. In the examples of FIGS. 2 and 3, this directional valve 109 is configured as a 2/1-way valve 110.

The examples of FIGS. 3, 4, 5 and 7 reveal also that the second feed 105b comprises a branch 111. Here, the second valve arrangement 107b is configured as two 2/1-way valves 110 (shown in FIG. 5). The two 2/1-way valves 110 realizing the second valve arrangement 107b are arranged in the second feed 105b so that by means of the second valve arrangement 107b the second feed 105b and/or the branch 111 are fluidically closable or able to freed for flowing through with refrigerant K.

Figure 4:
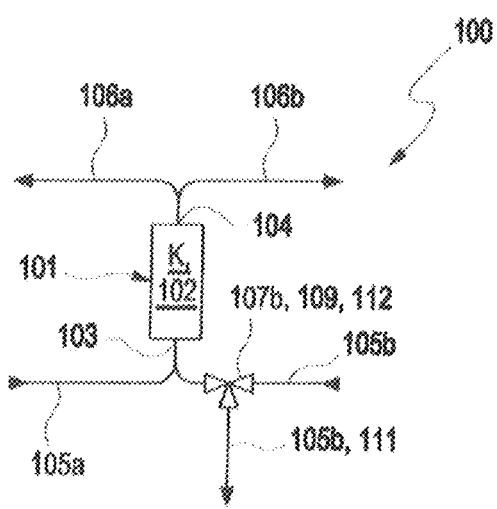
Figure 5:
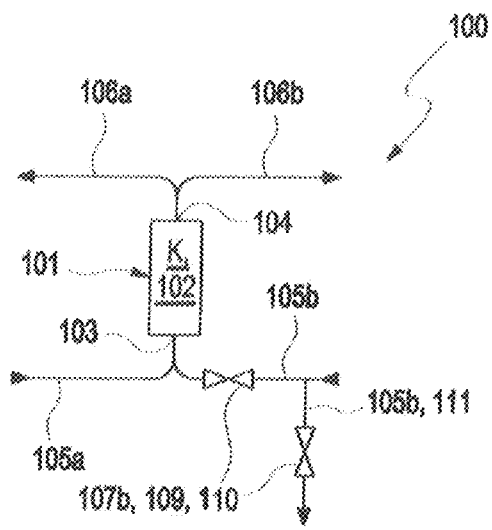

Contrary to the example of FIG. 5, in FIGS. 4 and 7 the second valve arrangement 107b is configured as a 3/2-way valve 112. Here, the 3/2-way valve 112 realizing the second valve arrangement 107b is arranged in the second feed 105b so that by means of the second valve arrangement 107b the second feed 105b and/or the branch 111 are fluidically closable or able to be freed for flowing through with refrigerant K.

Figure 6:
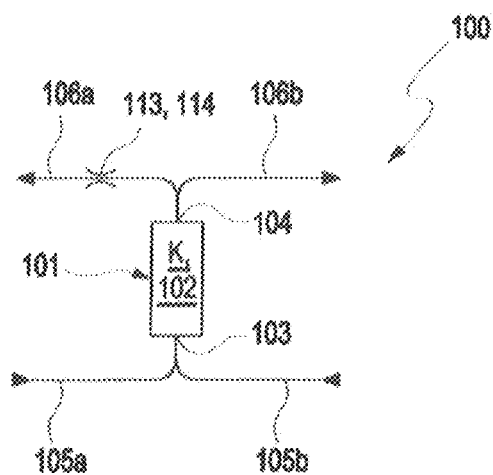

FIGS. 6 and 7 show in addition that in at least one discharge 106a, 106b a throttle arrangement 113 is present. In the illustrated examples, such a throttle arrangement 113 is arranged in the first discharge 106a. In the second discharge 106b such a throttle arrangement 113 is dispensed with. This means that in the examples of FIGS. 6 and 7 the throttle arrangement 113 is present exclusively in the first discharge 106a. The throttle arrangement 113 comprises for example an expansion valve 114 or respectively is such an expansion valve 114. The expansion valve 114 can be adjusted, in particular continuously, so that the first discharge 106a is either completely fluidically closed or at least partially fluidically to completely freed, therefore open.

Figure 8:
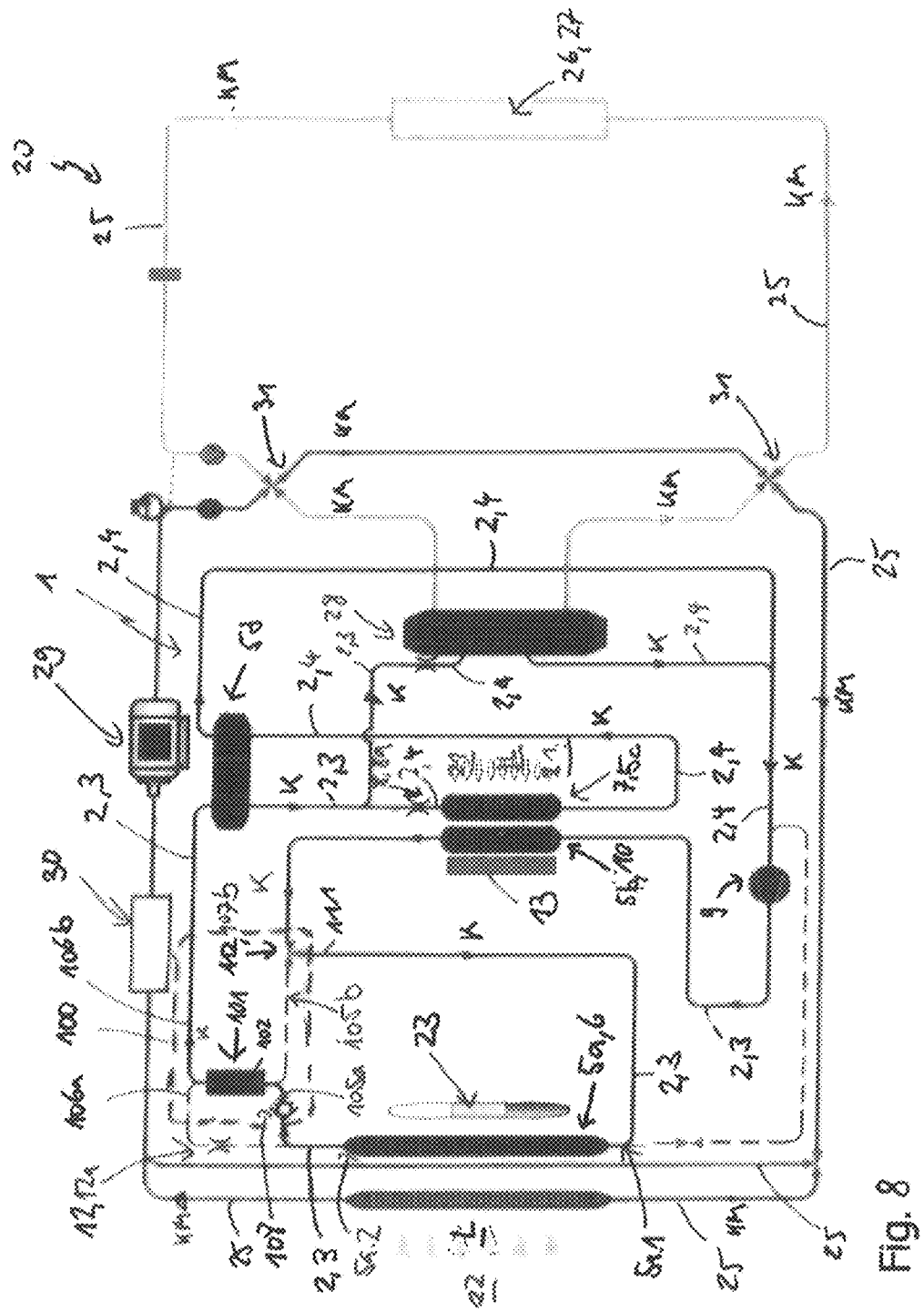
FIG. 8 shows, in a representation in the manner of circuit diagram, an example of a motor vehicle according to the invention with a refrigerant system situated in a first operating state.
Figure 9:
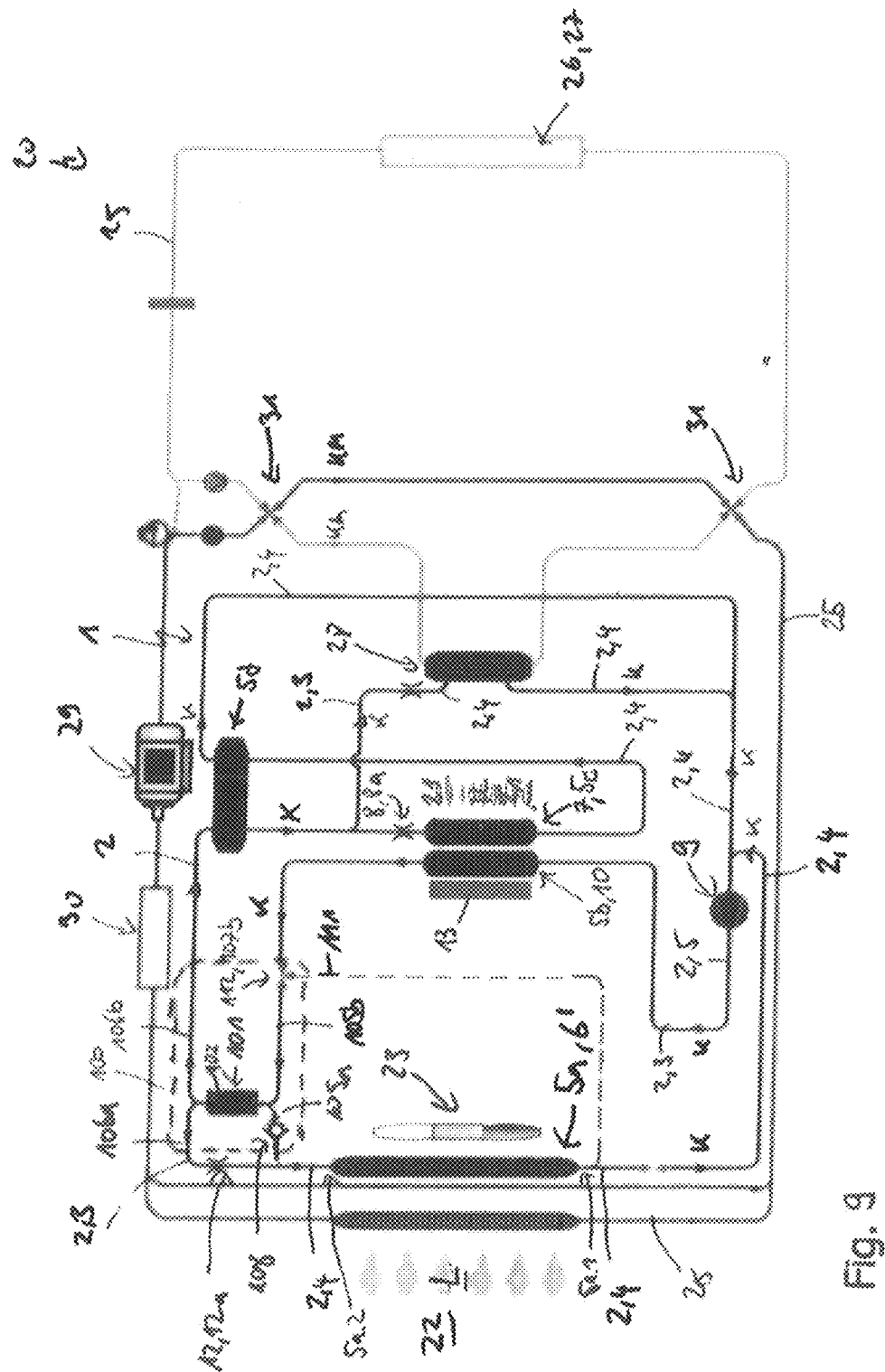
FIG. 9 shows the motor vehicle or respectively refrigerant system of FIG. 8 in a second operating state.
Figure 10:
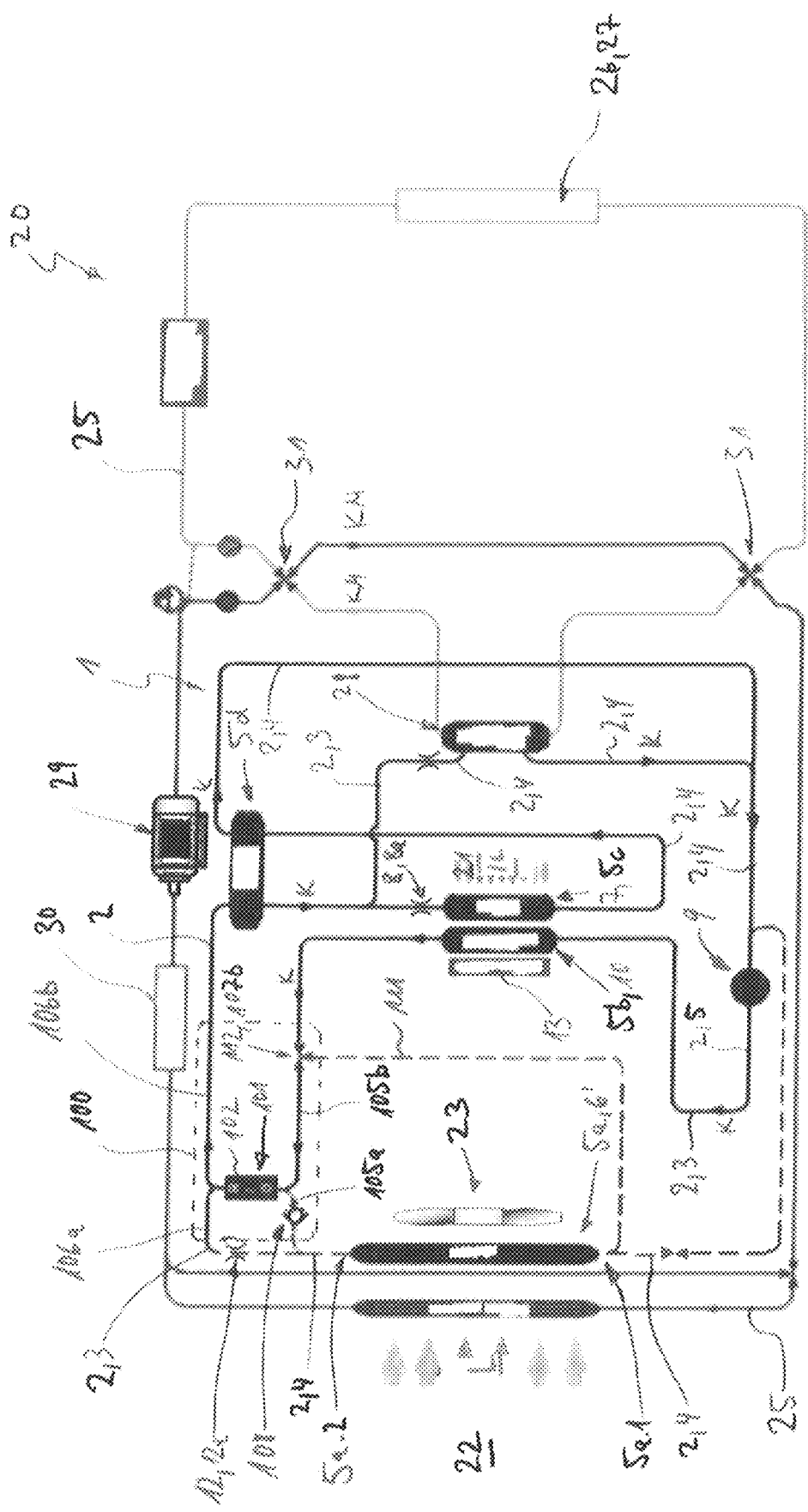
FIG. 10 shows the motor vehicle or respectively refrigerant system of FIGS. 8 and 9 in a third operating state.

FIGS. 8, 9 and 10 illustrated in schematic representation in the manner of a circuit diagram an example of a refrigerant system 1 according to the invention for an air conditioning system, not shown in further detail, of a motor vehicle 20. The motor vehicle 20, likewise not illustrated in further detail in FIGS. 8, 9 and 10, has a vehicle interior 21, which can be temperature-controlled by means of the air conditioning system. This takes place through heat transfer from the vehicle interior 21 into an external environment 22 of the motor vehicle 20 or in the reverse direction, therefore through heat transfer from the environment 22 into the vehicle interior 21. The vehicle interior 21 and the external environment 22 therefore form, depending on the direction of the heat transfer, respectively either a heat sink or a heat source. Thereby, by means of the refrigerant system 1 a particularly large spectrum of temperature control tasks can be fulfilled with different given configurations of the refrigerant system 1. Such temperature control tasks can be a feeding of heat to the vehicle interior 21 in a heat pump operation of the refrigerant system 1 or a discharging of heat from the vehicle interior 21 in a refrigeration machine operation of the refrigerant system 1.

It shall be understood that the refrigerant system 1, both in heat pump operation and also in refrigeration machine operation, is operated as a heat pump in the thermodynamic sense, wherein on switching over between heat pump operation and refrigeration machine operation the heat sink and the heat source change their position between vehicle interior 21 and external environment 22.

The refrigerant system 1 comprises a refrigerant circuit 2 which is divided into a high pressure region 3 and into a low pressure region 4. In the high pressure region 3, the intermediate store for refrigerant 100, explained above with the aid of FIGS. 1 to 7, is arranged, which in the example of FIG. 8 has the configuration shown in FIG. 7. The intermediate store for refrigerant 100 therefore has a first and a second feed 105a, 105b for the feeding of refrigerant K into the storage container 101, and a first and a second discharge 106a, 106b for the discharging of refrigerant K out of the storage container 101. The intermediate store for refrigerant 100 is fluidically connectable or connected with the first heat exchanger 5a by means of the first feed 105a, and is fluidically connectable or connected with the second heat exchanger 5b by means of the second feed 105b. No intermediate store for refrigerant is provided in the low pressure region 4 of the refrigerant circuit 2.

As FIG. 8 shows in addition, the intermediate store for refrigerant 100 communicates by means of its second feed 105b fluidically with the second heat exchanger 5b.

FIG. 8 shows the refrigerant system 1 in a first operating state, in which the vehicle interior 21 can be cooled—in particular with respect to the external environment 22. For this, heat is transported from the interior air IL present in the vehicle interior 21 into the external environment 22 of the motor vehicle by means of the refrigerant system 1, wherein the refrigerant K functions as transport medium for this heat. In this way, the interior air IL present in the vehicle interior 21 can be cooled.

In the first operating state shown in FIG. 8, the first heat exchanger 5a functions as condenser 6, in which air L guided through this condenser 6 out of the environment 22 of the motor vehicle 20 can receive heat from the refrigerant K which is likewise guided through the condenser 6. For this, the first heat exchanger 5a is arranged in the high pressure region 3 of the refrigerant circuit 2.

As FIG. 8 shows, said air L can be driven by means of a fan 23. After the emission of heat to the air L in the condenser 6 or respectively in the first heat exchanger 5a, the refrigerant K flows via the first feed 105a into the intermediate store for refrigerant 100, where it can be stored temporarily in the storage container 101. Said refrigerant K exits from the intermediate store for refrigerant 100 via the second discharge 106b out of the storage container 101 and is discharged in this way out of the intermediate store for refrigerant 100. From there, the refrigerant K flows into an expansion arrangement 8 in the form of an expansion valve 8a, likewise arranged in the refrigerant circuit 2, in which expansion arrangement/expansion valve the pressure of the refrigerant K is reduced in a known manner. In the expansion arrangement 8, the high pressure region 3 of the refrigerant circuit 2 therefore passes over into the low pressure region 4.

Downstream of the expansion arrangement 8, an evaporator 7 is arranged in the refrigerant circuit 2. This evaporator 7 is configured in a known manner as third heat exchanger 5c, which in addition to the refrigerant K is also flowed through by interior air IL present in the vehicle interior 21, and namely separated fluidically from the refrigerant K in a conventional manner. By heat transfer from the interior air IL to the refrigerant K in the evaporator 7, the interior air IL is cooled as desired.

After the flowing through of the evaporator 7, the refrigerant K is fed to a compressor 9 which is arranged in the refrigerant circuit 2, and the refrigerant K is compressed in a known manner. In the compressor 9 the low pressure region 4 therefore passes over into the high pressure region 3 of the refrigerant circuit 2 again. Downstream of the compressor 9, a second heat exchanger 5b is arranged, which can function as condenser 10 in the first operating state and therefore can emit a portion of the heat contained in the refrigerant K to the interior air IL again, which was also guided through the evaporator 7.

Downstream of the second heat exchanger 5b or respectively of the condenser 10, the intermediate store for refrigerant 100 follows with the 3/2-way valve 112 arranged in the second feed 105b.

In the first operating state shown in FIG. 8, this valve 112 is switched so that the fluidic connection to the refrigerant storage space 102 is interrupted. Consequently, the refrigerant K therefore flows via the branch 111 of the second feed 105b again into the first heat exchanger 5a functioning as condenser 6, so there under condensation it can emit heat to the air L present in the environment 22. In this way, the refrigerant circuit K is closed.

As can be seen from FIG. 8, after leaving the intermediate store for refrigerant 100, the refrigerant K flows exclusively via the second discharge 106b to the evaporator 7, but not through the first discharge 106a, because in the first operating state the first heat exchanger 5a or respectively the condenser 6 is arranged in the high pressure region 4 of the refrigerant circuit 2. An expansion arrangement 12 in the form of an expansion valve 12a, arranged between the first heat exchanger 5a and the first discharge 106a, is therefore not flowed through by the refrigerant K. The expansion arrangement 12 or respectively the expansion valve 12a can correspond to the throttle arrangement 113 or respectively to the expansion valve 114 of the intermediate store for refrigerant of FIGS. 6 and 7.

The first heat exchanger 5a has a first connection 5a.1 and a second connection 5a.2, which respectively serve for the directing of the refrigerant K into the first heat exchanger 5a or respectively out from the first heat exchanger 5a. In the first operating state, the first connection 5a.1 is fluidically connected with the branch 111 of the second feed 105b. The second connection 5a.2 is fluidically connected with the first feed 105a. The non-return valve 108 is open on flowing through with the refrigerant K from the second connection 5a.2 to the feed 105a.

As FIG. 8 shows in addition, a further cooling circuit 25 can be provided in the motor vehicle 20, in which a coolant KM circulates and in which an electrical energy store 26, for example an electric battery 27, an electric machine 29 and electronic/electrical components 30 are arranged, which can be cooled by transfer to the coolant KM of operationally generated waste heat.

By means of a chiller 28 arranged in the coolant circuit 25, which is formed by a heat exchanger, the heat received by the coolant KM—in the chiller 28—can be transferred to the refrigerant K of the refrigerant circuit 2. For this, the chiller 28 is arranged in the low pressure region 4 of the refrigerant circuit 2. The chiller 28 therefore for the transfer of heat from the coolant KM to the refrigerant K is flowed through both by the coolant KM and also, fluidically separately from this coolant KM, by refrigerant K. An expansion valve, associated with the chiller 28, can be present at the chiller 28. In the example of FIG. 8, the refrigerant K which is guided through the chiller 28 is guided in a fluidically parallel manner to the evaporator 7, so that the refrigerant K can either flow through the evaporator 7 or through chiller 28. In principle, a parallel operation of evaporator 7 and chiller 28 is also possible, so that refrigerant K flows through the evaporator 7 and the chiller 28 simultaneously.

As FIG. 8 shows furthermore, valves 31 can be arranged in the cooling circuit 25, by means of which the guiding of the coolant KM through the cooling circuit 25 can be adjusted and varied.

By means of a further—fourth—heat exchanger 5d arranged in the refrigerant circuit 2, from the refrigerant K, before the latter flows through the evaporator 7 and, alternatively or additionally, the chiller 28, heat can be transferred to the refrigerant K, which has already flowed through the evaporator 7. In this way, the refrigerant K, before the entry into the evaporator 7 and, alternatively or additionally, into the chiller 28, is additionally cooled, so that it can better receive heat from the interior air IL and/or from the coolant K circulating in the cooling circuit 25. In this way, the efficiency of the refrigerant circuit 2 is increased.

FIG. 9 illustrates a second operating state which is different from the first operating state of the refrigerant system 1. In the second operating state the vehicle interior 21 is heated by heat being transferred from the air L, present in the environment 22 of the motor vehicle 20, by means of the refrigerant K to the interior air IL present in the vehicle interior 21.

In contrast to the first operating state according to FIG. 8, the 3/2-way valve 112, therefore the valve arrangement 107b, is adjusted so that the first heat exchanger 5a is associated with the low pressure region 4 of the refrigerant circuit 2 or respectively is arranged therein. By means of the valve arrangement 107b, therefore in the example which is shown a flowing through of the first heat exchanger 5a with refrigerant K is prevented.

In the second operating state, the first connection 5a.1 of the first heat exchanger 5a is fluidically connected with the compressor 9, and the second connection 5a.2 is fluidically connected with the first discharge 106a of the intermediate store for refrigerant 100 or respectively with the valve 12a.

As shown in FIG. 9, refrigerant K which is present in the storage container 101 can not only be discharged exclusively via the second discharge 106b from the storage container 101 and can flow to the evaporator 7 or respectively chiller 28, as is the case in the first operating state according to FIG. 8, but flows primarily via the first discharge 106a into the expansion arrangement 12 or respectively into the expansion valve 12a, where the pressure of the refrigerant K is reduced. In the second operating state, the evaporator 7 can be passive, therefore deactivated.

The expansion arrangement 12 therefore forms the transition from the high pressure region 3 into the low pressure region 4 of the refrigerant circuit 2. Downstream of the expansion arrangement 12, the first heat exchanger 5a follows, which in contrast to the first operating state is flowed through in the reverse direction, therefore from the second connection 5a.2 to the first connection 5a.1, and not, as in the first operating state, from the first connection 5a.1 to the second connection 5a.2. As the first heat exchanger 5a is arranged downstream of the expansion arrangement 12, it is now situated—likewise in contrast to the first operating state according to FIG. 8—as already mentioned arranged in the low pressure region 4 of the refrigerant circuit 2. In the second operating state shown in FIG. 9, the first heat exchanger 5a does not form a condenser 6, but rather it acts as evaporator 6', which in operation transfers heat, present in the air L, to the refrigerant K.

FIGS. 8 and 9 therefore illustrate that the first heat exchanger 5a is configured and arranged in the refrigerant circuit 2 so that it is optionally—in the first operating state of the refrigerant system 2—is arranged in the high pressure region 3 and is operable there as condenser 6 or—in a second operating state of the refrigerant system 1—is arranged in the low pressure region 4 and is operable there as evaporator 6'. Here, the intermediate store for refrigerant 100 and the refrigerant circuit 2 with the first heat exchanger 5a are configured and coordinated with one another so that by means of the at least one valve arrangement 107a, 107b of the intermediate store for refrigerant 100 an adjustment can be made as to whether the first heat exchanger 5a is associated with the high pressure region 3 or with the low pressure region 4.

Furthermore, it can be seen from FIGS. 8 and 9 that the refrigerant system 1 is adjustable between the first and the second operating state by means of the at least one valve arrangement 107a, 107b of the intermediate store for refrigerant 100. In the first operating state, the first heat exchanger 5a communicates fluidically with the refrigerant storage space 102 by means of the first feed 105a of the intermediate store for refrigerant 100. By comparison, in the second operating state, the fluidic connection of the first heat exchanger 5a by means of the first feed 105a with the refrigerant storage space 102 is interrupted. Furthermore, in the second operating state the heat exchanger 5a communicates fluidically with the refrigerant storage space 102 by means of the at least one discharge 106a, 106b.

As FIG. 9 shows in addition, it is prevented by means of the non-return valve 108 arranged in the first feed 105a that refrigerant K can flow out of the storage container 101 via the first feed 106a directly into the first heat exchanger 5a.

As FIG. 9 additionally shows, the refrigerant K, after the flowing through of the first heat exchanger 5a or respectively of the evaporator 6', is fed to the compressor 9 again. The refrigerant K, compressed in the compressor 9, is introduced in an analogous manner to the first operating state after the compressing into the second heat exchanger 5b arranged downstream of the compressor 9. Thus, in an analogous manner to the first operating state, the heat received from the refrigerant K in the first heat exchanger 5a can be transferred to the interior air IL of the vehicle interior 21 which is guided through the second heat exchanger 5b or respectively the condenser 10, so that the interior air IL and thus the vehicle interior 21 are heated as desired.

As FIG. 9 further illustrates, it is also possible in the second operating state which is shown that a portion of the refrigerant K, directed out from the refrigerant intermediate space 100, is fed via the second discharge 106b to the evaporator 7 in an analogous manner to the first operating state, so that the refrigerant K can receive heat from the interior air IL of the vehicle interior 21. As the portion of refrigerant K is considerably less compared to the second operating state, this effect is distinctly less intensively marked than in the first operating state, so that as a whole the interior air I present in the vehicle interior 21 in total is not cooled as in the first operating state, but rather is heated.

As FIGS. 8 and 9 both show, the interior air IL can be heated additionally by means of an electric heating arrangement 13. The electric heating arrangement 13 can be active in particular in the second operating state, when the interior air IL is to be heated. The heating arrangement 13 can be activated in particular when the heating of the interior air IL by means of the refrigerant system 1 is not sufficient or is too inefficient, for example owing to too low a temperature of the air L in the external environment 22.

In FIG. 10 a third operating state of the refrigerant system 1, different from the first and from the second operating state, is illustrated. In this third operating state, the first heat exchanger 5a is not flowed through by the refrigerant K, so that the first heat exchanger 5a in the third operating state is passive, therefore deactivated. It can be additionally seen that in the third operating state the second heat exchanger 5b communicates fluidically with the refrigerant storage space 102 by means of the second feed 105b of the intermediate store for refrigerant 100. In the third operating state the expansion arrangement 12 or respectively the expansion valve 12a can be fluidically closed, so that the first discharge 106a is not flowed through by refrigerant KM.

In FIGS. 11A to 11E the intermediate store for refrigerant 100 of FIG. 7 is shown in various perspective illustrations. Accordingly, the storage container 101 is configured as a receiver drier 116, wherein in the refrigerant storage space 102 of the receiver drier a drying agent—not able to be seen in FIGS. 11A to 11E—which is able to be flowed through by the refrigerant K is received for the drying of refrigerant that is guided through the refrigerant storage space 102. Here, the first and the second feed 105a, 105b and the first and the second discharge 106a, 106b are arranged in a shared valve block 115. Here at least one selected one from the first and the second valve arrangement 107a, 107b and the throttle arrangement 113 can be fastened on the valve block 115. At least one selected one from the first and the second valve arrangement 107a, 107b and the throttle arrangement 113 can be screwed into the valve block 115. If applicable, at least one selected one from the first and the second valve arrangement 107a, 107b and the throttle arrangement 113 can be integrated in the valve block 115. In the practical example of FIGS. 11A to 11E, the second valve arrangement 107b and the throttle arrangement 113 are screwed into the valve block 115, wherein the first valve arrangement 107a is integrated in the valve block 115. It can be additionally seen that the valve block 115 is flanged laterally onto the receiver drier 116.

In the example of FIGS. 11A to 11E, the valve block 115 and the receiver drier 116 are soldered or screwed with one another, wherein a seal can be provided in a joint between the valve block 115 and the receiver drier 116. Instead of the arrangement which is shown, the receiver drier 116 and the valve block 115 can also be arranged at a distance from one another, wherein the fluidic connection between the receiver drier 116 and the valve block 115 is realized by means of pipelines, for example, in order to meet particularly restricted installation space conditions.

The invention claimed is:

1. An intermediate refrigerant store of a refrigerant system, comprising:
   a storage container delimiting, on an inner side, a refrigerant storage space;
   a first feed via which the refrigerant storage space is fluidically connectable to a first heat exchanger;
   a second feed via which the refrigerant storage space is fluidically connectable to a second heat exchanger, the second feed separate from the first feed;
   the first feed and the second feed fluidically connected with the refrigerant storage space for feeding of a refrigerant from the first heat exchanger and the second heat exchanger, respectively;
   at least one discharge fluidically connected to the refrigerant storage space and configured to discharge the refrigerant from the refrigerant storage space; and
   at least one valve arrangement disposed in an associated feed of the first feed and the second feed via which the associated feed is fluidically closable and openable.

2. The intermediate refrigerant store according to claim 1, wherein the at least one valve arrangement includes a plurality of valve arrangements, the plurality of valve arrangements including a first valve arrangement disposed in the first feed and a second valve arrangement disposed in the second feed.

3. The intermediate refrigerant store according to claim 1, wherein the at least one valve arrangement includes a non-return valve a forward direction of which extends towards the refrigerant storage space.

4. The intermediate refrigerant store according to claim 1, wherein the at least one valve arrangement includes a directional valve.

5. The intermediate refrigerant store according to claim 4, wherein:
   the second feed includes a branch;
   the at least one valve arrangement one of (i) includes two 2/1-way valves and (ii) is configured as a 3/2-way valve; and the second feed is the associated feed such that, via the at least one valve arrangement, at least one of the second feed and the branch is fluidically closable and openable.

6. The intermediate refrigerant store according to claim 1, wherein the at least one discharge includes a plurality of discharges including a first discharge and a second discharge that are fluidically connected with the refrigerant storage space via a single, shared outlet.

7. The intermediate refrigerant store according to claim 6, further comprising a throttle arrangement including an expansion valve, wherein the throttle arrangement is disposed in one of the plurality of discharges.

8. The intermediate refrigerant store according to claim 7, wherein:
the throttle arrangement is disposed in the first discharge; and
the storage container and the throttle arrangement are configured as and form a structurally integral unit with one another.

9. The intermediate refrigerant store according to claim 6, wherein the first feed, the second feed, the first discharge, and the second discharge are arranged in a shared valve block.

10. The intermediate refrigerant store according to claim 1, wherein at least the storage container and the at least one valve arrangement are configured as and form a structurally integral unit with one another.

11. The intermediate refrigerant store according to claim 1, wherein:
the storage container is configured as a receiver drier;
a drying agent is disposed in the refrigerant storage space, the drying agent configured to dry the refrigerant guided through the refrigerant storage space; and
the refrigerant is flowable through the drying agent.

12. The intermediate store for refrigerant according to claim 11, further comprising a shared valve block, wherein:
the at least one discharge includes a plurality of discharges including a first discharge and a second discharge;
the first feed, the second feed, the first discharge, and the second discharge are arranged in the shared valve block; and
the valve block is laterally flanged onto the receiver drier.

13. The intermediate refrigerant store according to claim 1, wherein the first feed and the second feed are fluidically connected with the refrigerant storage space via a single, shared inlet.

14. A method of operating a refrigerant system, the refrigerant system including a refrigerant circuit, at least three heat exchangers arranged in the refrigerant circuit, and an intermediate refrigerant store, the at least three heat exchangers including a first heat exchanger, a second heat exchanger, and a third heat exchanger, the intermediate refrigerant store including (i) a storage container delimiting, on an inner side, a refrigerant storage space, (ii) a first feed and a second feed separate from the first feed, the first feed and the second feed fluidically connected with the refrigerant storage space for feeding of a refrigerant, (iii) at least one discharge fluidically connected to the refrigerant storage space and configured to discharge the refrigerant from the refrigerant storage space, and (iv) at least one valve arrangement disposed in an associated feed of the first feed and the second feed via which the associated feed is fluidically closable and openable, the method comprising:

in a first operating state of the refrigerant system, transferring heat from the third heat exchanger to the refrigerant and emitting heat from the refrigerant in the first heat exchanger; and
in a second operating state of the refrigerant system, transferring heat to the refrigerant in the first heat exchanger and emitting heat from the refrigerant in the second heat exchanger.

15. The method according to claim 14, further comprising, in a third operating state of the refrigerant system, not flowing the refrigerant through the first heat exchanger such that the first heat exchanger is passive.

16. A refrigerant system for an air conditioning system of a motor vehicle, comprising:
a refrigerant circuit including a high pressure region and a low pressure region;
an intermediate refrigerant store arranged in the high pressure region, the intermediate refrigerant store including:
a storage container delimiting, on an inner side, a refrigerant storage space;
a first feed and a second feed separate from the first feed, the first feed and the second feed fluidically connected with the refrigerant storage space for feeding of a refrigerant;
at least one discharge fluidically connected to the refrigerant storage space and configured to discharge the refrigerant from the refrigerant storage space; and
at least one valve arrangement disposed in an associated feed of the first feed and the second feed via which the associated feed is fluidically closable and openable;
a plurality of heat exchangers including a first heat exchanger, a second heat exchanger, and a third heat exchanger;
the intermediate refrigerant store fluidically connected with the first heat exchanger via the first feed and fluidically connected with the second heat exchanger via the second feed; and
wherein the intermediate refrigerant store is fluidically connected with the third heat exchanger via the at least one discharge.

17. The refrigerant system according to claim 16, wherein another intermediate refrigerant store is not arranged in the low pressure region.

18. The refrigerant system according to claim 16, wherein the first heat exchanger is at least one of:
arranged in the high pressure region and operable as a condenser in a first operating state of the refrigerant system; and
arranged in the low pressure region and operable as an evaporator in a second operating state of the refrigerant system.

19. The refrigerant system according to claim 16, wherein the intermediate refrigerant store, the refrigerant circuit, and the first heat exchanger are configured and coordinated with one another such that, via adjusting the at least one valve arrangement, an arrangement of the first heat exchanger is adjustable to the high pressure region and to the low pressure region.

20. The refrigerant system according to claim 16, wherein the second heat exchanger is configured as a condenser and is arranged in the high pressure region.

21. The refrigerant system according to claim 16, wherein the third heat exchanger is configured as an evaporator for transferring heat of the refrigerant and is disposed in the low pressure region.

22. The refrigerant system according to claim 21, further comprising a chiller through which the refrigerant is flowable is arranged in the refrigerant circuit fluidically parallel to the evaporator, wherein the chiller is configured such that heat is feedable to the refrigerant flowing through the chiller.

23. The refrigerant system according to claim 22, wherein the chiller is arranged in a coolant circuit and a coolant is flowable through the chiller in a fluidically separated manner from the refrigerant such that heat is transferrable from the coolant to the refrigerant.

24. The refrigerant system according to claim 16, wherein:
the refrigerant system is adjustable between a first operating state and a second operating state via the at least one valve arrangement;
when in the first operating state, the first heat exchanger communicates fluidically with the refrigerant storage space via the first feed;
when in the second operating state, fluidic communication between the first heat exchanger and the refrigerant storage space via the first feed is interrupted; and
when in the second operating state, the first heat exchanger communicates fluidically with the refrigerant storage space via the at least one discharge.

25. The refrigerant system according to claim 24, wherein:
the first heat exchanger has a first connection and a second connection for directing the refrigerant into and out from the first heat exchanger, respectively;
when in the first operating state, the first connection is fluidically connected with a branch of the second feed, and the second connection is fluidically connected with the first feed; and
when in the second operating state, the first connection is fluidically connected with a compressor and the second connection is fluidically connected with the at least one discharge.

26. The refrigerant system according to claim 24, wherein:
the refrigerant system includes a third operating state and is adjustable into the third operating state from both the first operating state and the second operating state; and
when in the third operating state, the refrigerant does not flow through the first heat exchanger such that the first heat exchanger is passive.

27. The refrigerant system according to claim 26, wherein, when in the third operating state, the second heat exchanger communicates fluidically with the refrigerant storage space via the second feed.

28. A motor vehicle, comprising:
a vehicle interior;
the refrigerant system according to claim 16;
wherein the first heat exchanger is structured and arranged to at least one emit heat to and receive heat from an external environment of the motor vehicle;
wherein the second heat exchanger is structured and arrange to emit heat to the vehicle interior; and
wherein the third heat exchanger is structured and arranged to receive heat from the vehicle interior.

29. A method for operating the refrigerant system according to claim 16, comprising:
when in a first operating state of the refrigerant system, guiding the refrigerant from the first heat exchanger, where the refrigerant emits heat, to the intermediate refrigerant store such that the first heat exchanger acts as a condenser arranged in the high pressure region; and
when in a second operating state of the refrigerant system, guiding the refrigerant from the second heat exchanger, where the refrigerant emits heat, to the intermediate refrigerant store such that the second heat exchanger acts as a condenser.

30. The method according to claim 29, further comprising:
when in the second operating state of the refrigerant system, arranging the first heat exchanger in the low pressure region and operating the first heat exchanger as evaporator.

31. The method according to claim 29, making an adjustment via the at least one valve arrangement to adjust an arrangement of the first heat exchanger to one of the high pressure region and the low pressure region.

32. The method according to claim 31, wherein making an adjustment includes adjusting the at least one valve arrangement such that:
when in the first operating state, the first heat exchanger communicates fluidically with the refrigerant storage space via the first feed;
when in the second operating state, fluidic communication between the first heat exchanger and the refrigerant storage space via the first feed is interrupted; and
when in the second operating state, the first heat exchanger communicates fluidically with the refrigerant storage space via the at least one discharge.

33. The method according to claim 29, further comprising:
when in the first operating state, guiding no refrigerant from the second heat exchanger directly to the intermediate refrigerant store; and
when in the second operating state, guiding no refrigerant from the first heat exchanger directly to the intermediate refrigerant store.

34. The method according to claim 29, further comprising, when in a third operating state of the refrigerant system, flowing no refrigerant through the first heat exchanger such that the first heat exchanger is passive.

35. The method according to claim 34, wherein, when in the third operating state, the second heat exchanger communicates fluidically with the refrigerant storage space via the second feed.

* * * * *